(12) United States Patent
Nishikawa et al.

(10) Patent No.: US 7,186,949 B2
(45) Date of Patent: Mar. 6, 2007

(54) ARC WELDING EQUIPMENT

(75) Inventors: Seigo Nishikawa, Fukuoka (JP);
Ryuichi Morita, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 134 days.

(21) Appl. No.: 10/509,492

(22) PCT Filed: Mar. 31, 2003

(86) PCT No.: PCT/JP03/04140

§ 371 (c)(1),
(2), (4) Date: Sep. 29, 2004

(87) PCT Pub. No.: WO03/086696

PCT Pub. Date: Oct. 23, 2003

(65) Prior Publication Data
US 2005/0145610 A1   Jul. 7, 2005

(30) Foreign Application Priority Data
Apr. 2, 2002   (JP) ............................. 2002-099903

(51) Int. Cl.
*B23K 9/095*   (2006.01)
(52) U.S. Cl. ................................. 219/130.01
(58) Field of Classification Search .......... 219/130.01, 219/130.5; 228/103
See application file for complete search history.

(56) References Cited

U.S. PATENT DOCUMENTS 4,721,947 A * 1/1988 Brown ..................... 228/103
5,571,431 A * 11/1996 Lantieri et al. ........ 219/130.01
6,107,601 A * 8/2000 Shimogama .......... 219/130.01

FOREIGN PATENT DOCUMENTS

| CN | 1234306 A | 11/1999 |
|---|---|---|
| JP | 4285554 A1 | 10/1992 |
| JP | 6-238446 A | 8/1994 |
| JP | 7100649 A1 | 4/1995 |
| JP | 11-58007 A | 3/1999 |
| JP | 11-314156 A | 11/1999 |

* cited by examiner

*Primary Examiner*—Clifford C. Shaw
(74) *Attorney, Agent, or Firm*—Sughrue Mion, PLLC

(57) ABSTRACT

It is an object to provide an arc welding apparatus capable of causing an operator to easily decide a welding abnormality and the quality of a welding condition by simultaneously displaying a welding current command value, a welding voltage command value and a wire feeding speed command value and switching and displaying an actual welding current value, an actual welding voltage value and an actual wire feeding speed.

There are provided a welding torch (8), a wire feeding device for feeding a wire (9) in contact with the internal surface of a chip (17) of the welding torch (8), a welding source (4) for supplying a power to the chip (17) and a base metal (13), a welding current detector (30) and a welding voltage detector (31), and a wire feeding speed command value, a welding current value and a welding voltage value are displayed independently and simultaneously.

4 Claims, 3 Drawing Sheets

ARC WELDING EQUIPMENT

TECHNICAL FIELD

The present invention relates to an arc welding apparatus using a wire as a consumable electrode.

BACKGROUND ART

Conventionally, a welding source is provided with a welding current value meter and a welding voltage value meter, and an operator adjusts a welding condition while checking the meter of the welding source. In order to achieve a quality control for welding and to check the abnormality of a welding apparatus, moreover, there has been a monitor device for detecting a welding current value, a welding voltage value and a wire feeding speed by means of each detector.

As a conventional technique, moreover, JP-A-6-238446 has been disclosed. In the disclosure, a wire feeding speed detector is provided on the wire inlet side of the feeding motor roller of a feeding device and a display unit capable of directly reading a wire feeding speed is disposed. In the invention, the feedback of the wire feeding speed is detected by means of a speed detector and is thus displayed.

As described above, the conventional meter and display unit have been practically used as an online monitor.

However, in a welding source which is connected to an arc welding robot and is thus used, particularly, the following functions have been required for confirming a welding apparatus and a welding condition:

1) Confirmation of a welding current value and a welding voltage value which are ordered from the arc welding robot;

2) Confirmation of an actual welding current value and welding voltage value;

3) Conformation of a wire feeding speed ordered from the arc welding robot; and

4) Conformation of an actual wire feeding speed.

The welding current value, the welding voltage value and the wire feeding speed which are ordered are displayed in order to confirm that a command given from the arc welding robot is normally sent and to confirm a difference between the value of the command, the actual welding current value, welding voltage value and wire feeding speed.

Moreover, the conventional arc welding robot gives a command for only the welding current value and the welding voltage value. For this reason, there has been only a method of guessing the wire feeding speed ordered from the arc welding robot based on the welding current value ordered from the arc welding robot.

The conventional welding source and monitor device do not satisfy the functions 1) to 4) at the same time. For this reason, an operator cannot decide the abnormality of the welding apparatus and that of the welding condition.

DISCLOSURE OF THE INVENTION

In order to solve the problems, it is an object to provide an arc welding apparatus capable of displaying a welding current command value, a welding voltage command value and a wire feeding speed command value at the same time, and switching and displaying an actual welding current value, an actual welding voltage value and an actual wire feeding speed, thereby causing an operator to easily decide a welding abnormality and the quality of a welding condition.

A first aspect of the invention is directed to an arc welding apparatus comprising a welding torch, a wire feeding device for feeding a wire in contact with an internal surface of a chip of the welding torch, and a welding source for supplying a power to the chip and a base metal, wherein there are provided a welding current detector for detecting a welding current value and a welding voltage detector for detecting a welding voltage value, and a wire feeding speed command value, the welding current value and the welding voltage value are displayed independently and simultaneously.

A second aspect of the invention is directed to an arc welding apparatus comprising a welding torch, a wire feeding device for feeding a wire in contact with an internal surface of a chip of the welding torch, and a welding source for supplying a power to the chip and a base metal, wherein there are provided a welding current detector for detecting a welding current value, a welding voltage detector for detecting a welding voltage value, a wire feeding speed detector for detecting a wire feeding speed, current display selecting means for carrying out a selection to display one of the welding current value detected by the welding current detector and a welding current command value, current display means for displaying data selected by the current display selecting means, voltage display selecting means for carrying out a selection to display one of the welding voltage value detected by the welding voltage detector and a welding voltage command value, voltage display means for displaying data selected by the voltage display selecting means, feeding speed display selecting means for carrying out a selection to display one of the wire feeding speed detected by the wire feeding speed detector, a wire feeding speed command value and a wire feeding torque, and feeding speed display means for displaying data selected by the feeding speed display selecting means, and all of the current display means, the voltage display means and the feeding speed display means are independently disposed in the welding source.

A third aspect of the invention is directed to an arc welding apparatus comprising a robot having a welding torch provided on a tip of a manipulator and serving to weld a weld line which is taught, a robot control device for controlling the robot, a robot teaching device connected to the robot control device, a wire feeding device to be driven by means of a motor, and a welding source for supplying a power to a chip and a base metal, wherein one of a welding current command value and an actual welding current value is selected as welding current value data, one of a welding voltage command value and an actual welding voltage value is selected as welding voltage value data, one of a wire feeding speed command value, an actual wire feeding speed and a torque value of the motor is selected as wire feeding speed data, and the welding current value data, the welding voltage value data and the wire feeding speed data are simultaneously displayed on the robot teaching device.

BEST MODE FOR CARRYING OUT THE INVENTION

Figure 1:
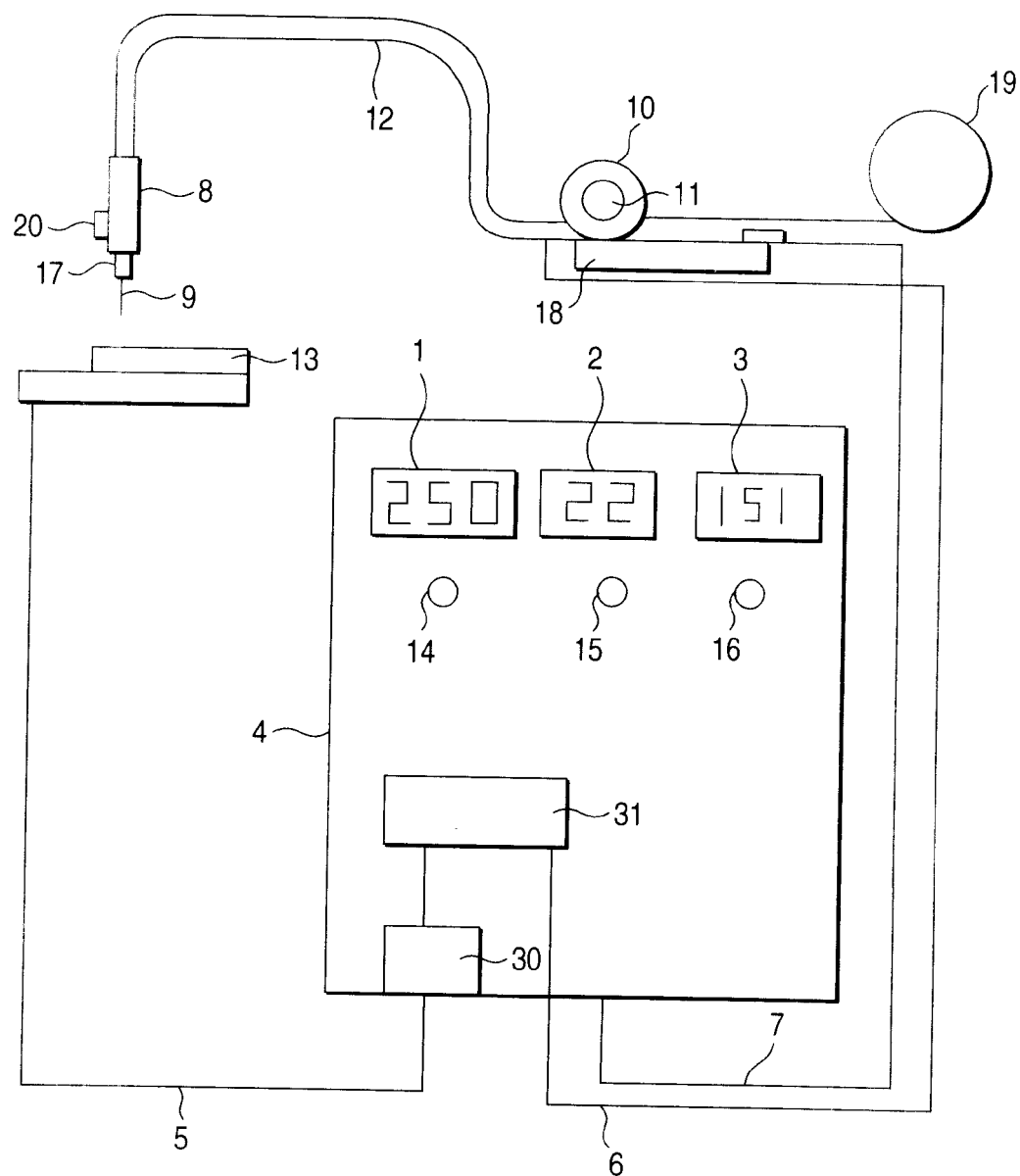
FIG. 1 is a diagram showing a structure according to a first embodiment of the invention.

A first embodiment of the invention will be described with reference to the drawings. FIG. 1 is a diagram showing a structure according to the invention. Current display means 1 selects and displays, through current display selecting means 14, one of a welding current command value and an actual welding current value detected by a welding current detector 30 (provided in a welding source 4). Voltage display means 2 selects and displays, through voltage display selecting means 15, one of a welding voltage command value and an actual welding voltage value detected by a welding voltage detector 31 (provided in the welding source 4). Feeding speed display means 3 selects and displays, through feeding speed display selecting means 16, one of a wire feeding speed command and an actual wire feeding speed detected by a wire feeding speed detector with having an encoder 11. In an apparatus according to the invention, a welding work is carried out in the following procedure. First of all, description will be given to the connection of the apparatus. A base metal side cable 5 connected to the welding source 4 is connected to a workpiece (base metal) 13 to be welded. It is sufficient that this is connected electrically and directly or indirectly. A wire 9 wound upon a wire reel 19 is fed out by driving a feeding motor 10, and is supplied to a torch 8 through the inside of a torch cable 12. A chip 17 is attached to the torch 8 and an electricity is carried in contact of the chip 17 with the wire 9. A torch side cable 6 connected to the welding source 4 is connected to the torch cable 12, thereby supplying a power between the chip 17 and the workpiece 13. A feeding motor cable 7 is connected to a feeding base 18 to rotate the feeding motor 10. The feeding motor 10 is rotated based on a position command or a speed command which is given from the welding source 4. Moreover, the feeding speed detector 11 serves to detect the position of the feeding motor 10.

Figure 2:
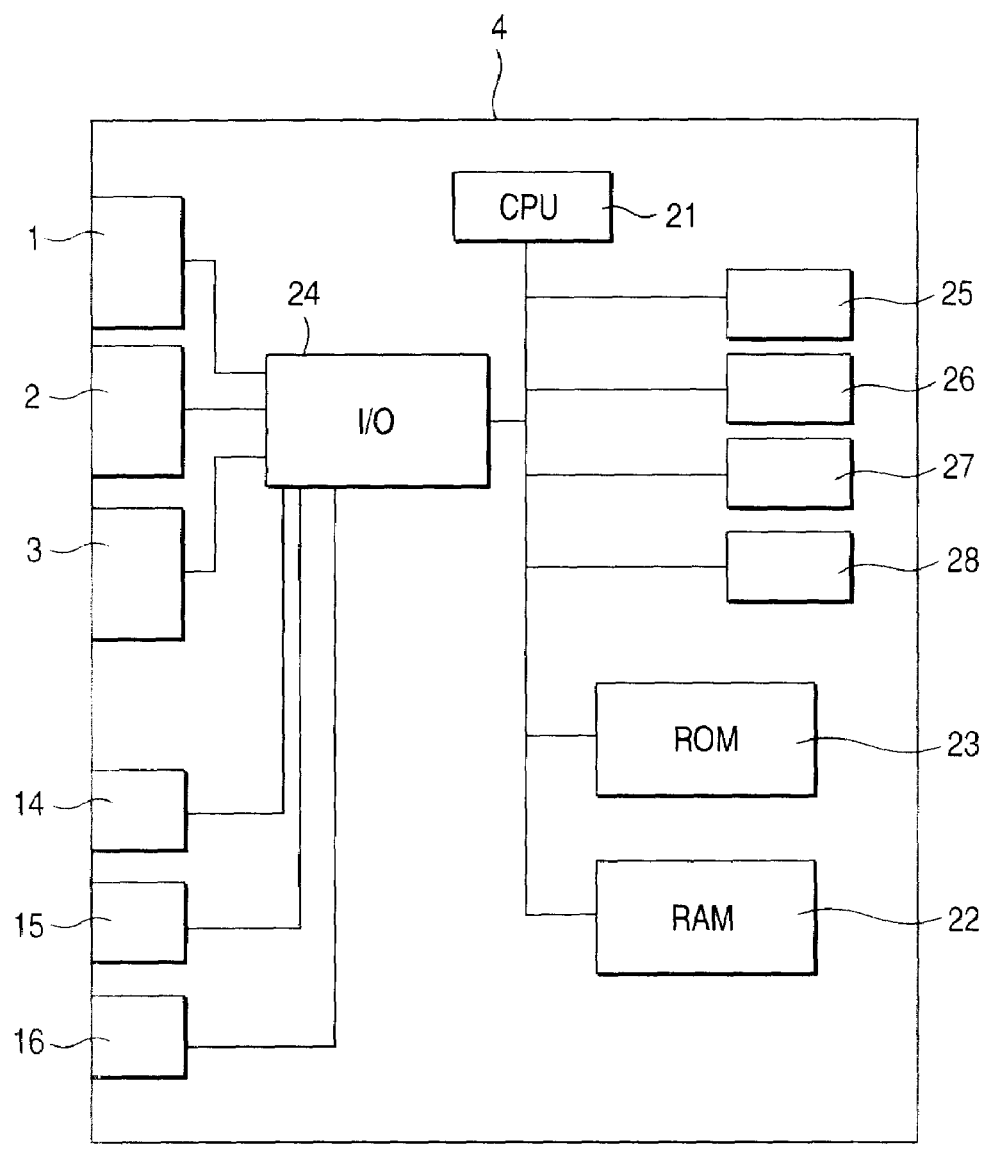
FIG. 2 is a block diagram showing the invention.

Next, the operation of the apparatus will be described. FIG. 2 is a block diagram showing the apparatus. A CPU 21 in the welding source 4 reads and executes a program stored in an ROM 23. After setting a desirable welding condition, an operator presses down a torch switch 20 attached to the torch 8 so that a command for a welding start is input to the welding source 4. The CPU 21 reads a welding current command value, a welding voltage command value and a wire feeding speed command value from the ROM 23 onto an RAM 22 in order to satisfy the input welding condition. The CPU 21 reads an input from the welding current detector through an analog input 25 and reads an input from the welding voltage detector through an analog input 26. The encoder 11 is attached to the wire feeding motor 10 and the position of the wire feeding motor 10 can be detected. The CPU 21 reads the input of the position of the encoder 11 through a pulse counter 27. A temporal difference in the read value is taken by the pulse counter 27 and a wire feeding speed is thus calculated. Moreover, the current of the wire feeding motor is connected to an analog input 28 and the CPU 21 reads a current value from the analog input 28, thereby calculating the torque value of the wire feeding motor 10. Furthermore, the CPU 21 reads the setting of the current display selecting means 14 through an I/O unit 24 and displays, on the current display means 1, one of a welding current command value and an actual welding current value sent from the analog input 25. The CPU 21 reads the setting of the voltage display selecting means 15 through the I/O unit 24 and displays, on the voltage display means 2, one of a welding voltage command value and an actual welding voltage value sent from the analog input 26. Similarly, the CPU 21 reads the setting of the wire feeding speed display selecting means 16 through the I/O unit 24 and displays, on the wire feeding speed display means 3, one of a wire feeding speed command value, an actual wire feeding speed sent from the encoder 11 and a motor torque value read from the analog input 28.

Figure 3:
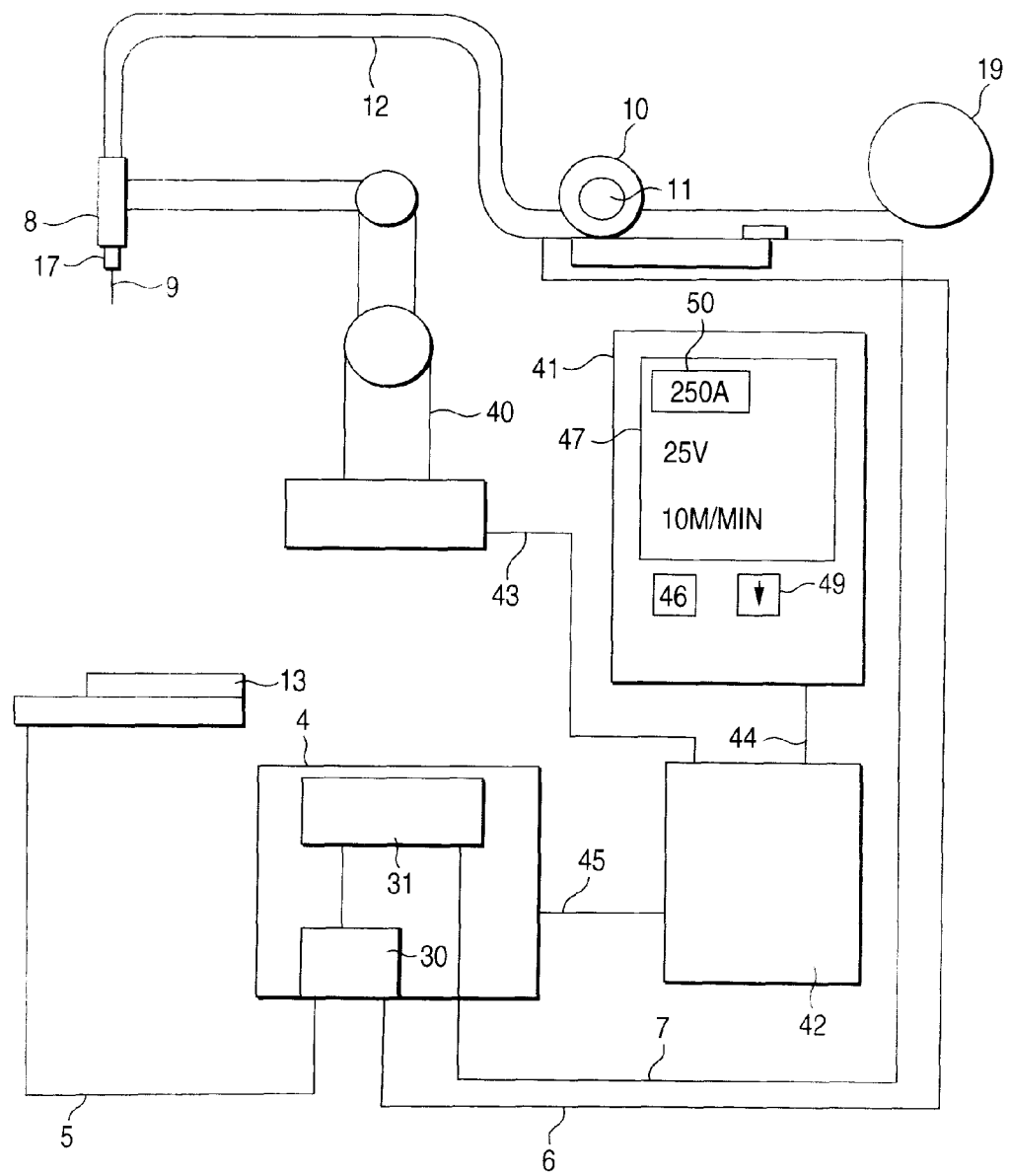
FIG. 3 is a diagram showing a structure according to a second embodiment of the invention.

A second embodiment of the invention will be described with reference to FIG. 3. In a structure according to the invention, a robot 40 holds a torch 8 in the finger portion of an arm, thereby welding a workpiece (base metal) 13. The robot 40 is connected to a robot control device 42 through a control cable 43. The control cable 43 supplies a control signal and a power which serve to drive the motor of each joint of the robot 40. The robot control device 42 and a teaching device 41 are connected through a teaching device cable 44. By manipulating the teaching device 41, an operator operates the robot 40. A welding source 4 and the robot control device 42 are connected through a welding control cable 45, and the robot control device 42 gives a command for a welding start and end and a welding condition to the welding source 4 according to the execution of the program of the robot. Moreover, an actual welding current value detected by a welding current detector 30 provided in the welding source 4 and an actual welding voltage value detected by a welding voltage detector 31 are sent to the robot control device 42 through the welding control cable 45. Similarly, the position of a feeding motor 10 which is sent from an encoder 11 is also converted into an actual wire feeding speed in the welding source 4 and a notice is given to the robot control device 42 through the welding control cable 45. This communicating method is implemented by an analog or digital communication.

Display means 47 is provided in the teaching device 41 and serves to create and edit a program. Moreover, the display means 47 displays a welding current value, a welding voltage value and a wire feeding speed. The display means 47 switches the contents of display through an arrow key 49 and a selecting button 46. For example, it is assumed that a welding current command value, a welding voltage command value and a wire feeding speed command value are displayed. It is assumed that an operation cursor 50 is placed in a portion in which a welding current command is displayed. At this time, when the selecting button 46 is once pressed down, an actual welding voltage value is displayed. By pressing down the arrow key 49, moreover, it is possible to adjust the operation cursor 50 to a desirable display position, thereby switching the contents of the display. When the arrow key 49 is pressed down twice, the operation cursor 50 is moved to a portion for the wire feeding speed command. At this time, when the selecting button 46 is once pressed down, an actual wire feeding speed is displayed. When the selecting button 46 is pressed down once more, the torque value of the wire feeding motor 10 is displayed. An operator sees the torque value when deciding that a wire 9 is normally fed through the cable handling of a torch cable 12. In other words, in the case in which the torch cable 12 is entangled in the arm of the robot 40 or is bent due to a welding attitude, the torque value is increased.

According to the invention, the welding current command value, the welding voltage command value and the wire feeding speed command value are displayed at the same time so that the operator can instantly recognize that the welding condition is proper or not. By switching the display to an actual welding current value, voltage value and wire feeding speed, moreover, it is possible to grasp an actual welding situation. By displaying the torque value of the feeding motor, furthermore, it is possible to decide the lifetime of the torch cable, and whether or not the cable handling is proper. According to the apparatus in accordance with the invention, thus, it is possible to carry out a welding work remarkably and rapidly, and furthermore, to prevent the abnormality of quality of welding. Therefore, industrial advantages can be obtained very greatly.

INDUSTRIAL APPLICABILITY

The invention is useful for an arc welding apparatus utilizing a wire as a consumable electrode.

The invention claimed is:

1. An arc welding apparatus comprising:
   a welding torch,
   a wire feeding device operable to feed a wire in contact with an internal surface of a chip of the welding torch,
   a welding source operable to supply a power to the chip and a base metal,
   a welding current detector operable to detect welding current value and
   a welding voltage detector operable to detect a welding voltage value,
   wherein the apparatus is operable to display a wire feeding speed command value, the welding current value and the welding voltage value independently and simultaneously.

2. The apparatus of claim 1 wherein the welding current detector, the welding voltage detector and a display means that is operable to display the welding current value, the welding voltage value and the wire feeding sped command value are disposed in the welding source.

3. An arc welding apparatus comprising:
   a welding torch,
   a wire feeding device operable to feed a wire in contact with an internal surface of a chip of the welding torch,
   a welding source operable to supply a power to the chip and a base metal,
   a welding current detector operable to detect a welding current value,
   a welding voltage detector operable to detect a welding voltage value,
   a wire feeding speed detector operable to detect a wire feeding speed,
   current display selecting means for carrying out a selection to display one of the welding current value detected by the welding current detector and a welding current command value,
   current display means for displaying data selected by the current display selecting means,
   voltage display selecting means for carrying out a selection to display one of the welding voltage value detected by the welding voltage detector and a welding voltage command value,
   voltage display means for displaying data selected by the voltage display selecting means,
   feeding speed display selecting means for carrying out a selection to display one of the wire feeding speed detected by the wire feeding speed detector, a wire feeding speed command value and a wire feeding torque, and
   feeding speed display means for displaying data selected by the feeding speed display selecting means,
   wherein all of the current display means, the voltage display means and the feeding speed display means are independently disposed in the welding source.

4. An arc welding apparatus comprising a robot having a welding torch provided on a tip of a manipulator and serving to weld a weld line which is taught, a robot control device for controlling the robot, a robot teaching device connected to the robot control device, a wire feeding device to be driven by means of a motor, and a welding source for supplying a power to a chip and a base metal,
   wherein the apparatus is operable to select one of a welding current command value and an actual welding current value as welding current value data, and
   the apparatus is operable to select one of a welding voltage command value and an actual welding voltage value as welding voltage value data, and
   the apparatus is operable to select one of a wire feeding speed command value, an actual wire feeding speed and a torque value of the motor as wire feeding speed data, and the apparatus is operable to display the welding current value data, the welding voltage value data and the wire feeding speed data simultaneously on the robot teaching device.

* * * * *